United States Patent Office 2,754,165
Patented July 10, 1956

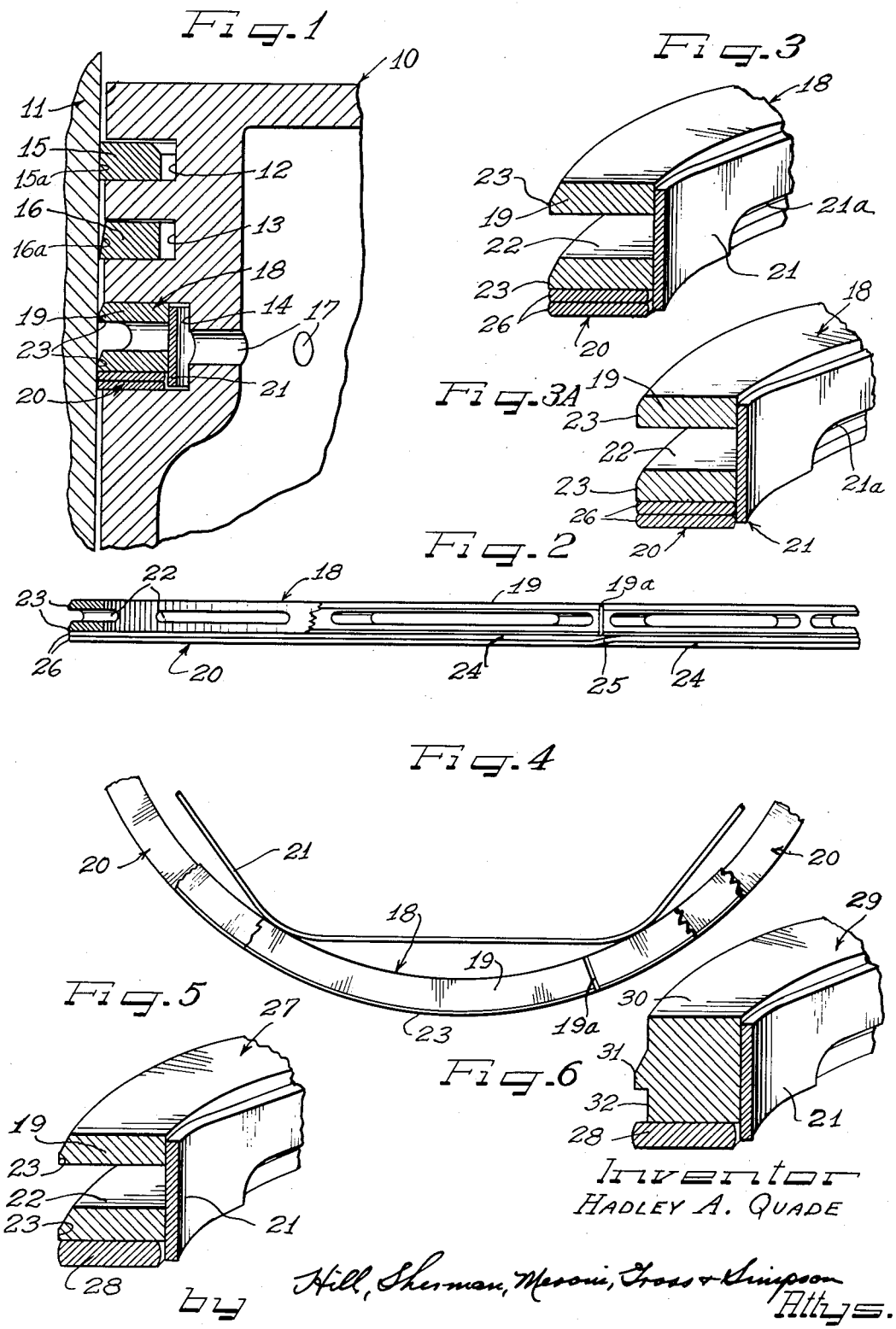

2,754,165

PISTON RING

Hadley A. Quade, Glendale, Mo., assignor to Ramsey Corporation, Cleveland, Ohio, a corporation of Ohio Application November 26, 1951, Serial No. 258,180

5 Claims. (Cl. 309—44)

This invention relates to a piston or packing ring which will wear away very rapidly to assure quick seating and, when properly seated, will resist wear under all operating conditions.

Specifically, this invention deals with an oil control piston ring having a cast iron part with a narrow cylinder wall contacting area on the outer periphery thereof to develop a high unit pressure for a quick wear-in and a juxtaposed slow wearing element adapted to become effective as a seal only after the cast iron part has worn down into good sealing relation with the cylinder wall.

According to this invention, a solid or slotted type cast iron oil control piston ring is provided with a very narrow cylinder wall contacting face. A steel ring of less radial thickness or width is positioned adjacent the cast iron ring. This steel ring has a hard wear-resisting cylinder wall engaging face or edge. An expander ring is inserted within the two adjacent rings to successively expand the cast iron ring and the steel ring. In operation, the cast iron ring alone will initially be acted on by the expander to seat against the cylinder wall, while the steel ring is spaced outwardly from the expander and exerts only its own inherent pressure against the cylinder wall. As the cast iron ring wears down into full conforming seating relation with the cylinder wall, its radial width is decreased until the expander ring engages the steel ring, whereupon the hardened cylinder wall engaging face of the steel ring comes into firm sealing contact with the cylinder wall. When this occurs, the rate of wear of the assembly is changed from a fast rate to a very slow rate because the hardened face on the steel ring will resist wear and the radial width of this steel ring will prevent the expander from forcing the iron ring against the cylinder wall until the wall engaging faces of both rings are worn into axial alignment.

While it has heretofore been proposed to use steel rings in combination with iron rings in piston ring assemblies, the ordinary steel rings heretofore used could not withstand certain engine operating conditions such as occur when the cylinder wall is improperly lubricated. In accordance with this invention, therefore, the desired degree of wear resistance is provided by a hard wear resisting steel ring such as a nitrided steel ring, a chromium plated steel ring, or a high alloy high carbon steel ring.

It is, then, an object of this invention to provide a packing ring which will wear in rapidly but will not wear out rapidly.

Another object of this invention is to provide a piston ring assembly composed of a rapidly wearing cast iron part and a slow wearing hardened steel part coacting with the cast iron part to come into operation only after the cast iron part has worn into good fitting relationship with the cylinder wall.

Another object of this invention is to provide an oil control piston ring composed of a cast iron ring having a narrow cylinder contacting face area developing a high unit pressure, and adapted to quickly conform with a cylinder wall together with a hardened relatively thin steel ring segment of less radial width than the cast iron part and adapted to come into operation only after the cast iron part has worn down into conforming relation with the cylinder wall, whereupon the hardened steel ring will slow down further wear of the assembly.

A still further object of this invention is to provide an oil control piston ring assembly composed of a cast iron piston ring having a rapidly wearing narrow cylinder wall contacting face wearing to a wide cylinder wall contacting face, and coacting with a relatively thin steel ring segment having a hard wear-resistance cylinder wall engaging face.

Other and further objects of the invention will be apparent to those skilled in the art from the following detailed description of the annexed sheet of drawings which, by way of preferred examples only, illustrates several embodiments of the invention.

On the drawings:

Figure 1 is a fragmentary vertical cross-sectional view of a piston and cylinder assembly equipped with an oil control ring assembly according to this invention.

Figure 2 is a side elevational view of the oil control ring assembly of Figure 1 with parts broken away and shown in vertical cross-section.

Figure 3 is a fragmentary perspective view of the oil control ring assembly of Figures 1 and 2.

Figure 3a is a view similar to Figure 3 but showing the relationship of the parts after the "break-in" period of operation.

Figure 4 is a fragmentary plan view of the oil control ring assembly of Figures 1 to 3.

Figure 5 is a fragmentary perspective view of a modified oil control ring assembly according to this invention.

Figure 6 is a view similar to Figure 5 illustrating another modified form of oil control ring assembly according to this invention.

As shown on the drawings:

In Figure 1, the reference numeral 10 designates generally a piston of an internal combustion engine mounted in an engine cylinder 11. The piston 10 has a top ring groove 12, a middle ring groove 13, and a bottom ring groove 14. A conventional solid cast iron piston ring 15 is mounted in the top groove 12 and has a broad cylinder wall engaging face 15a. The middle groove 13 receives a solid cast iron compression ring 16 having a beveled or tapered cylinder wall engaging face 16a which initially contacts the cylinder wall along a narrow area and eventually wears down into a wider contacting band area.

The bottom ring groove 14 is wider than the grooves 12 and 13 and is joined through oil holes 17 with the interior of the piston.

An oil control ring assembly 18 of this invention is mounted in the groove 14. This assembly 18 includes a slotted cast iron ring 19, a multiturn helical steel ring 20, and an expander ring 21. The cast iron ring 19 is a split annulus of appreciable height which is under contracting load in the cylinder 11 to decrease the width of the gap 19a (Figure 2) between the ends thereof. The ring is circumferentially slotted at spaced intervals around its periphery to provide elongated radially extending holes or slots 22 therethrough joining the outer and inner faces of the ring. The outer face is divided by the slots into upper and lower rims each having tapered lands 23 to provide narrow cylinder contacting areas. These narrow areas will develop high unit pressure against the cylinder wall due to the expanding force of the ring and will rapidly wear down into good seating relationship with the cylinder wall. As the contacting faces wear down they become increasingly wider due to the taper thereof and the unit pressure will be decreased so that the wearing tendency will slow down.

Oil will flow through the slots 22 and be drained back to the crankcase through the holes 17.

The ring 20 is a flat thin steel ribbon of less radial thickness or width than the ring 19. The ribbon-like ring 20 is helically coiled with the flat faces thereof in superimposed relation to provide almost two complete turns so that the ends 24 will be separated only through a small arcuate distance. The ribbon is kinked to provide a crossover 25 in this arcuate gap between the ends 24. This crossover 25 in the gap positions the opposed top and bottom faces of the ring 20 in single planes.

The ring 20 fits freely in the ring groove 14 and is not radially contracted enough by the cylinder wall 11 so as to engage the expander ring 21. Therefore, in the initial break-in period of operation of the ring assembly 18 of this invention, the ring 20 is not loaded by the expander. However, as shown in Figure 3a as soon as the tapered faces 23 of the ring 19 wear down so that the expander 21 can act on the ring 20, the ring 20 is expanded firmly against the cylinder wall. Until the faces 23 of the ring 18 have worn down into full conforming relation with the cylinder the ring 20 will only act on the cylinder with its own inherent expanding force.

The ring 20 has two outer faces 26 in stacked superimposed relation effective to sealingly engage the cylinder wall under the influence of the expander ring 21. The entire ring 20, or at least this pair of faces 26, is hardened and wear resistant, so as to provide a very slow wearing ring. The ring 20 can be a hardened nitrided steel of about 900 Brinell, a case hardened wear-resisting carbon steel of about 750 Brinell, or the faces 26 can be plated with a hard metal such as chromium to about 975 Brinell. Rings of ordinary hardened and tempered steel now in common use have an average hardness of 400 Brinell. The hardened ring of this invention will have a Brinell hardness of from about 700 to about 1000. A preferred hardness range for nitrided steel rings of this invention is 800–1000 Brinell; for case hardened steel rings is 700–800 Brinell and for chromium surfaced steel rings is 950 to 1000 Brinell.

The expander ring 21, which is bottomed in the groove 14 behind the ring assembly 18, as shown in Figure 3, has slots or recesses 21a therein to accommodate free passage of oil so that the holes 17 are not blocked.

In the modification shown in Figure 5, the oil control ring assembly 27 includes the same cast iron ring 19 and expander 21 as the assembly 18. However, the helix ring 20 of the assembly 18 is replaced by a single thin flat steel ring segment 28. This ring segment 28 is split in the same manner as the ring 19 and is composed of a hard, wear-resisting steel or a steel that has been coated with a hard resisting covering such as chromium. The ring 28 has its radial thickness or width less than this dimension of the ring 19 so that, during the initial break-in period of operation, the ring 28 is not loaded by the expander although it may seat against the cylinder wall. However, when the narrow lands 23 of the ring 19 wear down to permit the ring 19 to enlarge its inside diameter so that the expander 21 comes into contact with the ring 28, this steel ring 28 then controls the expander load on the cast iron ring 19 and will slow down the rate of wear of the assembly.

In the modification shown in Figure 6, the assembly 29 includes the same steel segment ring 28 and the same expander 21 of the assembly 27 shown in Figure 5. However, a solid cast iron ring 30 is provided in place of the slotted ring 19. This ring 30 is a split annulus of appreciable axial height and radial depth and has a localized bead 31 on its outer face forming a narrow cylinder contacting area projecting beyond the outer face 32 of the ring. This bead 31 will rapidly wear down away so that the expander 21 can become effective to act on the ring segment 28 and urge both rings 28 and 30 against the cylinder wall.

From the above descriptions, it will be understood that this invention provides an oil control ring composed of an expander, a steel ring part having a high hardness characterized by a Brinell hardness range of 700 to 1000, and a radially wider or thicker cast iron ring part of the solid or slotted type and having one or more narrow cylinder contacting areas developing high unit pressures through the action of the expander. This assembly has a high initial wear rate which is limited to a short break-in period by the hard, wear resisting steel ring which comes into operation after the narrow cylinder contacting area wears down and permits the expander ring to act on the steel ring. The assemblies of this invention provide a universal design which is useful in all types of engines and under all types of engine operating conditions. In previously known combinations of steel and iron rings short wear life has resulted under certain engine operating conditions because an ordinary steel ring actually wears faster than cast iron under conditions of scanty lubrication. In those prior known uses of hard steel rings, no quick even break-in feature was provided. Now the desired wear-in features of causing the ring to conform to the shape of the cylinder are not destroyed by providing the hard wear resisting steel rings in the combination of the present invention.

It will be understood that modifications and variations may be effected without departing from the scope of the novel concepts of the present invention.

I claim as my invention:

1. A compound ring assembly comprising a compound ring including a thin steel ring and a cast iron ring in juxtaposition therewith, a spring expander within the compound ring initialy exerting its tension on the cast iron ring, said cast iron ring having an outer peripheral quick-wearing edge of reduced area adapted to engage an adjoining cylinder wall at increased unit pressure, and a hard outer peripheral edge surface of at least about 700 Brinell hardness on said steel ring providing a wear-resistant bearing surface, said steel ring having an inner peripheral surface initially spaced from said spring expander an amount sufficient to insure rapid wear of said edge of reduced area and quick seating of said cast iron ring, whereupon engagement of said inner peripheral surface with said spring expander and coincident concentricity of said wear-resistant bearing surface and the outer peripheral edge of said cast iron ring will limit subsequent wear of said cast iron ring.

2. A compound ring assembly comprising a compound ring including a thin steel ring and a cast iron ring in juxtaposition therewith, a spring expander within the compound ring initialy exerting its tension on the cast iron ring, said cast iron ring having an outer peripheral quick-wearing edge of reduced area adapted to engage an adjoining cylinder wall at increased unit pressure, a hard outer peripheral edge surface having a hardness in the order of 700 to 1000 Brinell on said steel ring providing a wear-resistant bearing surface, and an inner peripheral surface on said steel ring being initially spaced from said spring expander an amount sufficient to insure rapid wear of said edge of reduced area and quick seating of said cast iron ring, whereupon engagement of said inner peripheral surface with said spring expander and coincident concentricity of said wear-resistant bearing surface and the outer peripheral edge of said cast iron ring will limit subsequent wear of said cast iron ring.

3. A compound ring assembly as defined in claim 2 wherein said thin steel ring and said hard outer peripheral edge surface of said steel ring is provided by nitrided steel having a hardness range in the order of 800–1000 Brinell.

4. A compound ring assembly as defined in claim 2 wherein said hard outer peripheral edge surface on said steel ring is provided by a case-hardened portion having a hardness range in the order to 700–800 Brinell.

5. A compound ring assembly as defined in claim 2 wherein said hard outer peripheral edge surface of said steel ring is provided by a chromium plated portion having a hardness range in the order of 950–1000 Brinell.

References Cited in the file of this patent

UNITED STATES PATENTS

| | | |
|---|---|---|
| 1,911,755 | Grover | May 30, 1933 |
| 2,068,115 | Solenberger | Jan. 19, 1937 |
| 2,128,372 | Marien | Aug. 30, 1938 |
| 2,234,159 | Marien | Mar. 4, 1941 |
| 2,240,624 | Marien | May 6, 1941 |
| 2,288,911 | Marien | July 7, 1942 |
| 2,398,030 | Morton | Apr. 9, 1946 |
| 2,650,869 | Marien | Sept. 1, 1953 |

FOREIGN PATENTS

| | | |
|---|---|---|
| 441,634 | Great Britain | Apr. 23, 1935 |

OTHER REFERENCES

Automobile Trade Journal, pp. 44 and 53, November 1939.

Mark's Handbook, 4th ed. (1941), pp. 568 and 607.